(12) United States Patent
Hart et al.

(10) Patent No.: US 7,513,972 B2
(45) Date of Patent: Apr. 7, 2009

(54) PORTABLE BRINE EVAPORATOR UNIT, PROCESS, AND SYSTEM

(75) Inventors: Paul John Hart, Indiana, PA (US); Bruce G. Miller, State College, PA (US); Ronald T. Wincek, State College, PA (US); Glenn E. Decker, Bellefonte, PA (US); David K. Johnson, Port Matilda, PA (US)

(73) Assignee: Hart Resource Technologies, Inc., Creekside, PA (US)

( * ) Notice: Subject to any disclaimer, the term of this patent is extended or adjusted under 35 U.S.C. 154(b) by 487 days.

(21) Appl. No.: 10/850,626

(22) Filed: May 21, 2004

(65) Prior Publication Data

US 2004/0261952 A1  Dec. 30, 2004

Related U.S. Application Data

(60) Provisional application No. 60/472,684, filed on May 22, 2003.

(51) Int. Cl.
*B01D 1/18* (2006.01)
*C02F 1/12* (2006.01)

(52) U.S. Cl. .......................... 159/47.3; 23/306; 159/4.3; 159/33; 159/34; 159/42; 159/48.1; 210/774; 210/776

(58) Field of Classification Search .................. 159/4.3, 159/33, 34, 42, 47.3, 48.1; 210/767, 774, 210/776; 75/330; 432/107; 23/306
See application file for complete search history.

(56) References Cited

U.S. PATENT DOCUMENTS

| | | | |
|---|---|---|---|
| 903,357 A | 11/1908 | Clifton | |
| 1,671,446 A | 5/1928 | Paulus | |
| 1,721,760 A | 7/1929 | Zeitler | |
| 2,392,893 A | 1/1946 | Williamson | |
| 2,643,974 A | 6/1953 | Impagliazzo | |
| 3,248,305 A | 4/1966 | Williamson | |
| 3,732,911 A | 5/1973 | Lowe et al. | |
| 4,026,676 A | 5/1977 | Fiedelman | |
| 4,083,781 A | 4/1978 | Conger | |
| 4,094,734 A | 6/1978 | Henderson | |
| 4,105,556 A | 8/1978 | O'Amaddio et al. | |
| 4,188,291 A | 2/1980 | Anderson | |
| 4,245,998 A | 1/1981 | Okouchi et al. | |
| 4,313,785 A * | 2/1982 | Schellstede | 159/6.2 |
| 4,351,252 A | 9/1982 | Shindome et al. | |
| 4,366,063 A | 12/1982 | O'Connor | |
| 4,447,329 A | 5/1984 | Broughton | |
| 4,649,655 A * | 3/1987 | Witten | 34/135 |
| 4,695,248 A | 9/1987 | Gray | |
| 4,797,981 A | 1/1989 | Ninane et al. | |
| 4,804,477 A | 2/1989 | Allen et al. | |
| 4,882,009 A | 11/1989 | Santoleri et al. | |

(Continued)

*Primary Examiner*—Virginia Manoharan
(74) *Attorney, Agent, or Firm*—Meyer, Unkovic & Scott LLP; David G. Oberdick

(57) ABSTRACT

The present invention discloses a comprehensive, efficient, and cost effective portable evaporator unit, method, and system for the treatment of brine. The evaporator unit, method, and system require a pretreatment process that removes heavy metals, crude oil, and other contaminates in preparation for the evaporator unit. The pretreatment and the evaporator unit, method, and system process metals and brine at the site where they are generated (the well site). Thus, saving significant money to producers who can avoid present and future increases in transportation costs.

3 Claims, 16 Drawing Sheets

U.S. PATENT DOCUMENTS

| | | |
|---|---|---|
| 4,949,655 A | 8/1990 | Greer et al. |
| 4,983,259 A * | 1/1991 | Duncan et al. .............. 196/106 |
| 5,132,090 A | 7/1992 | Volland |
| 5,207,928 A | 5/1993 | Lerner |
| 5,221,528 A | 6/1993 | Jongema |
| 5,328,490 A | 7/1994 | Farmer, Jr. et al. |
| 5,366,514 A | 11/1994 | Becnel, Jr. et al. |
| 5,582,680 A * | 12/1996 | Vankouwenberg et al. .... 159/23 |
| 5,695,643 A | 12/1997 | Brandt et al. |
| 6,162,361 A * | 12/2000 | Adiga ........................ 210/652 |

* cited by examiner

PORTABLE BRINE EVAPORATOR UNIT, PROCESS, AND SYSTEM

RELATED APPLICATION

This application claims the benefit of U.S. Provisional Application No. 60/472,684, filed May 22, 2003, the contents of which are incorporated herein by reference in their entirety.

STATEMENT REGARDING FEDERALLY SPONSORED RESEARCH OR DEVELOPMENT

This invention was made, in part, with government support under Grant No. FC26-00NT41025 awarded by the United States Department of Energy.

FIELD OF THE INVENTION

This invention relates to a portable brine evaporator unit, process and system for primary use in the treatment of wastewater by-products from oil and gas well production.

BACKGROUND OF THE INVENTION

It is well known that oil and gas well production involves the generation of wastewater by-products, including salt water referred to as brine. Typically, the brine is separated at the well site during the production of gas and oil. The disposal of brine wastewaters in an economic and environmentally safe manner has been a major problem for the oil and gas industries. Such wastewaters contain salt, calcium, oil, soap, barium, strontium, magnesium, iron, and other contaminants, some of which are harmful if discharged untreated into the environment. State agencies require that oil and gas producers, or their service contractors, dispose of their wastewater by approved processes. Storage tanks are erected at the well site to store brine produced from the well. Environmental requirements, imposed by the Environmental Protection Agency and state and local government agencies, require the responsible party associated with the production operations to separate and properly store, transport, and dispose of their wastewater by-products.

Depending upon applicable environmental requirements, the responsible parties associated with the oil and gas production have limited options for the disposal of brine. In most gas and oil producing regions, the brine is filtered and/or chemically treated and then injected into underground disposal wells. For most operations in the Appalachian Basin, the treatment of the brine occurs at a centralized treatment facility. Those facilities typically have higher disposal fees than injection wells. Oil and gas producers are in need of more options for disposal, especially since the cost of transportation will continue to increase. Producers need disposal options that reduce costs, reduce the need for transportation, and protect the environment.

The market for brine disposal encompasses all oil and gas producing regions, including those in the Appalachian Basin, which includes New York, Pennsylvania, West Virginia, Eastern Ohio, Kentucky, and Tennessee. Injection wells for the disposal of the brine have not been successful in most of the Appalachian Basin because of the low porosity and permeability of the rock, the concerns with contamination of fresh groundwater flow, and the need for pretreatment of the brine prior to injection. Therefore, that vast area must be covered by means of permanent centralized facilities for treating the brine.

One brine treatment plant presently operates in Creekside, Pa. That plant is located in Indiana County, at the edge of one of the largest natural gas producing regions in western Pennsylvania. Approximately 90% of the brine processed by that plant is generated from wells within thirty miles of the plant. The remaining 10% is transported from greater distances, as far away as West Virginia, Ohio, and New York. Although most of the brine originates within the surrounding counties, an average cost of $2.10 per barrel is spent on transporting the brine to that brine treatment plant. As shown in Table 1, the transportation costs per barrel increased over the past fifteen (15) years, while the disposal cost decreased. The cost for transporting brine is expected to continue increasing as the associated expenses (i.e., fuel, labor, and truck maintenance) continue to rise.

The prior and related art discloses various processes and apparatuses that function, but are not ideal, for handling brine. One such less than ideal process evaporates the brine within metal pans by burning wellhead natural gas to generate the energy for evaporation. A problem with that approach is that the crystallized salt settles to the bottom of the pan, insulating the remaining brine from the heat source. A second problem is that the units are prone to fires. Additionally, no pretreatment occurs to separate the harmful heavy metals from the brine. The pretreatment allows for the beneficial use of the solid salt product with a reduced risk of those metals entering the surface or groundwater.

Some existing evaporators include a forced circulation falling film evaporator and a rotary drum dryer. The forced circulation falling film evaporator utilizes a two-step approach by which the brine is concentrated within the falling film evaporator and then dried to minimum moisture content inside a secondary device such as a spray-drying chamber. Use of a rotary drum dryer appears to be well suited to some solutions, and could accomplish the evaporation in a single step.

Any solution to evaporating the treated brine is strongly effected by the liquid's characteristics. Properties such as solids concentration, temperature sensitivity of the salts, liquid forming, scaling, and corrosiveness (i.e., to required materials of construction) must be considered. Since brine is usually high in sulfates or calcium carbonate, scale forms on the heat transfer surfaces during evaporation. Also, the brine becomes more corrosive the further concentrated it becomes, which is a problem for some evaporators. A falling film design with heat transfer surfaces arranged in a vertical configuration, allows for high brine concentrations while maintaining high heat transfer rates, minimizing the build up of scale on the heat transfer surfaces.

It is often difficult to locate a supplier of direct-fired falling film evaporators that can operate solely on the available supply of natural gas for energy. The use of steam in combination with mechanical vapor recompression is a common process of supplying the energy for evaporation in this type of evaporator. That approach, while being efficient, requires additional equipment and a supply of treated water to generate the required steam. Also, the required second stage drying chamber must be sufficiently large to prevent the droplets from striking solid surfaces before drying takes place, resulting in large drying chambers. Drying chambers with diameters of eight (8) to thirty (30) feet are common. As a result, this type of evaporating equipment is too costly and too large for providing portable on-site evaporation of the brine.

Many existing water and brine purification techniques utilize reverse osmosis. Examples of such techniques are U.S. Pat. Nos. 4,105,556, 4,188,291, and 4,366,063. The reverse osmosis process tends to be expensive and has limited tolerance to many salts present in brine, particularly calcium salts.

Similarly, U.S. Pat. No. 5,695,643 ("'643 Patent") teaches a process of treating and disposing of wastewater from oil and gas wells using reverse osmosis. Again, the reverse osmosis procedure is more expensive to employ. Additionally, the process of the '643 Patent utilizes limited pretreatment of the brine and requires that the end product be injected into subterranean formations.

Other alternative processes include: crystallizing the salts (U.S. Pat. Nos. 4,245,998 and 4,797,981), and injecting the water solution into an incinerator in which the salts fuse, the water evaporates, and the organic components burn off (U.S. Pat. No. 4,351,252). Unfortunately, these processes do not employ the pretreatment step of the present invention.

U.S. Pat. No. 4,649,655 ("'655 Patent") teaches an apparatus for dehydrating slurries; particularly water-based drilling fluids contain drill cuttings. The slurry is injected against a wall of a rotating drum. Flash evaporation of the slurry liquids leaves only the solids on the drum, which can be scraped off. This invention is not designed to be mobile, nor is it designed to be connected to an on-site brine tank. It cannot handle concentrated brine and does not include the necessary pretreatment step, which is essential to any apparatus' ability to positively impact the environment. The lack of a pretreatment step also affects the quality of the solid remaining after dehydration of the slurry. In the present invention, the pretreatment removes the metals from the brine, leaving a purer, salable salt product of the brine evaporation. The '655 Patent lacks an ability to produce such a product. Additionally, the invention disclosed by the '655 Patent is labor intensive in comparison to the unmanned operation of the evaporator unit of the present invention.

U.S. Pat. No. 4,804,477 ("'477 Patent") teaches an apparatus and process for concentrating oil well brine at the well site. The '477 Patent suffers from the same shortcoming of not using pretreated brine, which would remove the metals before the brine evaporates. The apparatus and process have other shortcomings as well. Two men must attend to the apparatus while it runs. Additionally, the invention disclosed by the '477 Patent uses a condensate collection system, whereas the present invention discharges the vapors into the atmosphere. The invention of the '477 Patent uses internal evaporation, as opposed to the hot surface, rotating drum of the present invention. Finally, the present invention involves direct heating, whereas the '477 Patent uses an internal boiler with a shell.

The present invention utilizes another process of brine evaporation, which consists of a heated metal cylinder on the outside of which is a thin layer of brine that evaporates to dryness. The dried salt is scraped off the cylinder as it revolves. This approach offers an advantage because a rotary drum can be heated directly by a natural gas-fired burner, which allows the evaporator to be utilized at the well site. That single step process also reduces the amount of equipment required for placement on the skid, which alleviates some concerns about space. Space is otherwise a great concern because a natural gas powered generator is required to supply the electricity necessary for the brine pump, motors, and system controls.

The present invention, therefore, provides a novel on-site brine treatment unit, method, and system to safely, efficiently, and effectively evaporate brine. The development of the present invention's portable brine treatment unit, method, and system lower costs to producers with marginal wealth, thus, increasing competition. The cost of on-site treatment will be considerably lower than centralized treatment due to the lower capital costs, fewer man hours, and lower transportation costs. The only requirement for processing of the brine is an available supply of natural gas. It is estimated that through successful on-site treatment, brine could be processed for approximately $1.26 per barrel or $0.03 per gallon, representing a 40% cost savings to Appalachian producers. Also, less time is needed for on-site treatment making it possible that up to four different sites could be processed during a given shift of an employee, depending on the location, volume, and quality of the brine. The novel evaporator unit, method, and system of the present invention, in particular, will greatly change the disposal market by providing the industry greater convenience at a lower cost.

Salt is a salable product of the on-site evaporation of brine. It has been estimated that an average of 1.5 to 1.75 lbs. of salt (sodium chloride and calcium chloride) can be recovered from each gallon of brine that is evaporated. Evidence established that salt produced through the operation of a 30,000 gallon/day/operator/crystalizer at traditional evaporator plants in the early 1990s sold without any difficulties.

Table 2 provides a typical analysis of the salt product and shows that over 95% by weight is comprised of chloride such as calcium chloride, sodium chloride, and magnesium chloride. Several minor constituents exist in much lower concentrations. The salt, although not of sufficient purity for food grade use, could be used for dust suppression, roadbed stabilization, and the control of ice on road surfaces. Hydgroscopic compounds, such as calcium chloride, have proven to be an effective agent to suppress dust and stabilize roadbeds. Commercial products in the form of solid salts have been effectively used for many years in road treatments.

TABLE 2

Typical Analysis of Salt Recovered Through Evaporation of Treated Brine

| | Weight Percent |
|---|---|
| Major Constituents | |
| $CaCl_2$ | 20 |
| NaCl | 75 |
| $MgCl_2$ | 2 |
| $CaSO_4$ | 1 |
| Minor Constituents | |
| $BaSO_4$ | 66 ppm |
| LiCl | 240 ppm |
| Fe | 2 ppm |
| Heavy Metals | <5 ppm |

The success of the brine evaporator unit, method, and system of the present invention is influenced significantly by the use of a pretreatment step. Those skilled in the art will recognize that a variety of different pretreatment processes may be used. One example process is discussed here for purposes of illustration and not limitation. Preferably, a pretreatment process will be chosen that satisfies governmental regulations for disposal. The process should remove contaminants and settleable solids from the brine, such as heavy metals and crude oil.

The chosen pretreatment process should be able to occur at the well site by erecting a storage and/or pretreatment tank at the well site. Brine would be pumped from a storage tank into a pretreatment tank. The brine should be treated and/or filtered to remove all solids and contaminants. Finally, treated brine should be pumped into a temporary tank and will be ready for evaporation.

BRIEF SUMMARY OF THE INVENTION

One of the objectives of the present invention is to provide a comprehensive, efficient, and cost effective evaporator unit, method, and system for the treatment of brine. The present invention allows for great cost savings to oil and gas companies and it positively impacts the environment. The evaporator unit, method, and system require a pretreatment process that removes heavy metals, crude oil, and other contaminates in preparation for the evaporator unit and method. It will be obvious to those skilled in the art that other pretreatment processes may be substituted and will achieve the same result. Such pretreatment allows for the elimination of brine without causing harm to the environment and while allowing for a salable salt product.

The pretreatment and the evaporator unit, method, and system process metals and brine at the site where they are generated (the well site). Thus, saving significant money to producers who can avoid present and future increases in transportation costs. One embodiment of the present invention has been designed for a natural gas well site where all the equipment needed for the treatment of the brine is included on one mobile vehicle. Additionally, only one employee is needed to perform the required pretreatment and to start the evaporation process/unit because the evaporator runs automatically unmanned, and only requires someone to start it, which in turn keeps costs at a minimum.

The brine, when brought to the surface, is separated from the natural gas inside a gas-liquid separator and stored in tanks adjacent to the wellhead. An example of a typical wellhead and brine tank is shown in FIG. 1. Inside the brine tank there are three layers: the oil on top, the brine in the middle, and the sludge (a by-product from drilling natural gas wells) on the bottom. The amount of each layer varies.

It will be obvious to those skilled in the art that various pretreatment processes may be used. One such process will be described here for illustration, not limitation. The first step in the pretreatment method is to separate (on-site) the brine from the oil and sludge. Then brine may be pumped into a portable tank leaving a small amount of the brine in the brine tank to minimize other contaminants (oil or tank sludge) from being mixed into the raw liquid brine that is to be processed. Next, the brine may be chemically treated for the purpose of dropping out the dissolved metals. This chemical treatment step in the present process can be the same as those processes presently performed at stationary brine treatment plants.

Once the metals have been removed, the final step in the on-site processing will be the evaporation of the brine using the evaporation drum. The portable unit, method, or system will be taken to the well site and operated for a sufficient period of time until all the treated brine has been evaporated, leaving only a solid salt product. The only unused by-product in the process is water vapor, which is released into the atmosphere.

The present invention also encompasses a skid-mounted system that can be transported to a well site on a small trailer (preferably approximately 14' by 6.5'), connected to the brine tank and natural gas supply, and operated unattended until the available brine is evaporated. Thus, this makes the present invention significantly more cost efficient than methods requiring constant supervision.

Other objects, advantages, and novel features of the invention will become more apparent from the following Detailed Description when taken in conjunction with the accompanying drawings.

BRIEF DESCRIPTION OF THE DRAWINGS

For the present invention to be easily understood and readily practiced, the present invention will now be described, for purposes of illustration and not limitation, in conjunction with the following figures, wherein.

DETAILED DESCRIPTION OF THE INVENTION

Figure 1:
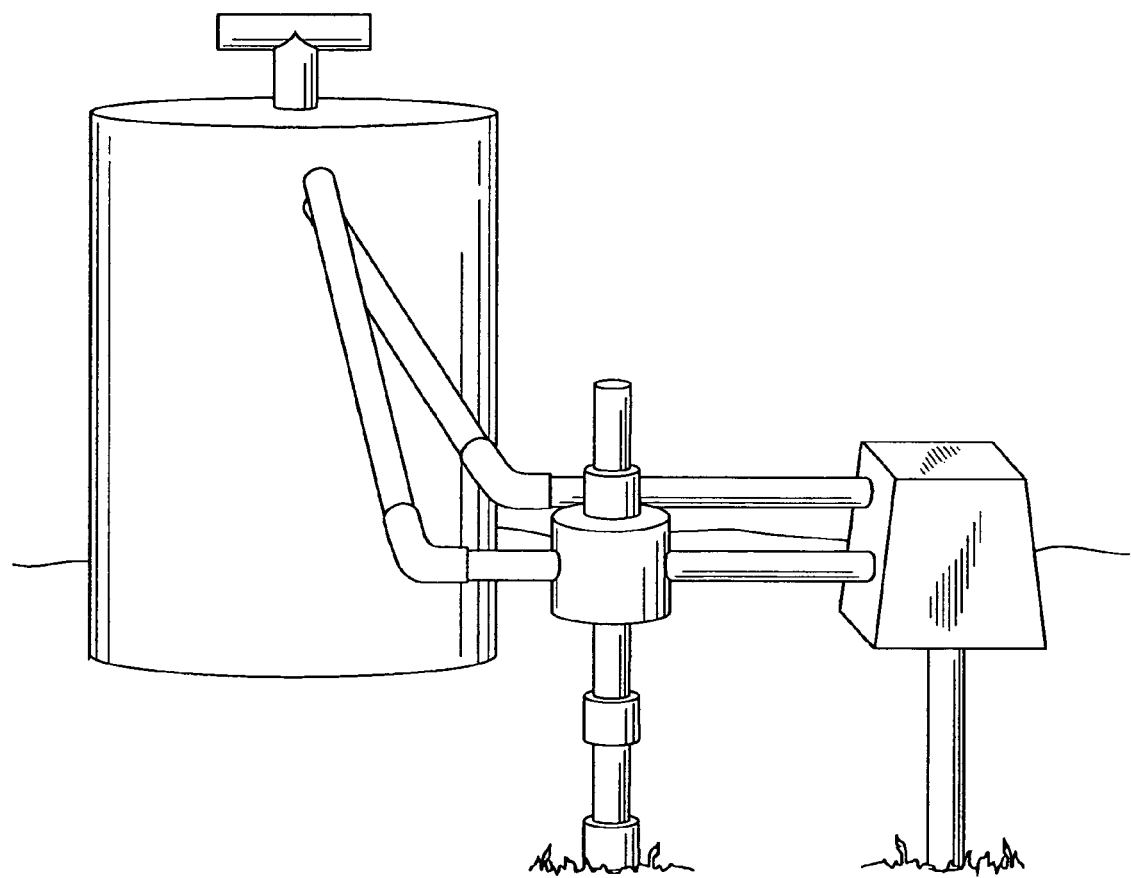
FIG. 1 illustrates a natural gas well with a gas-liquid separator and a brine tank.
Figure 2:
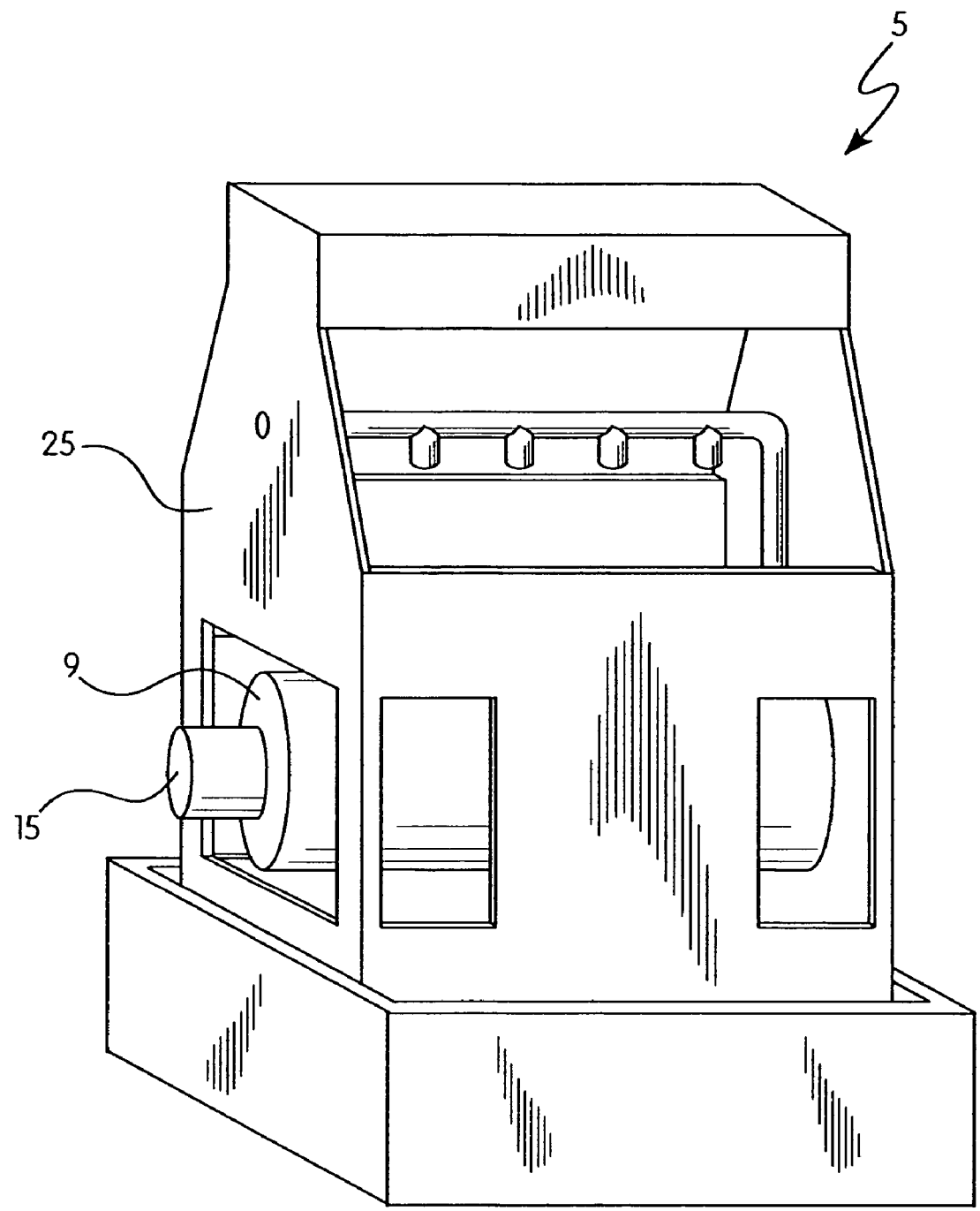
FIGS. 2 and 3 show different views of portions of one embodiment of the novel evaporator unit of the present invention.
Figure 3:
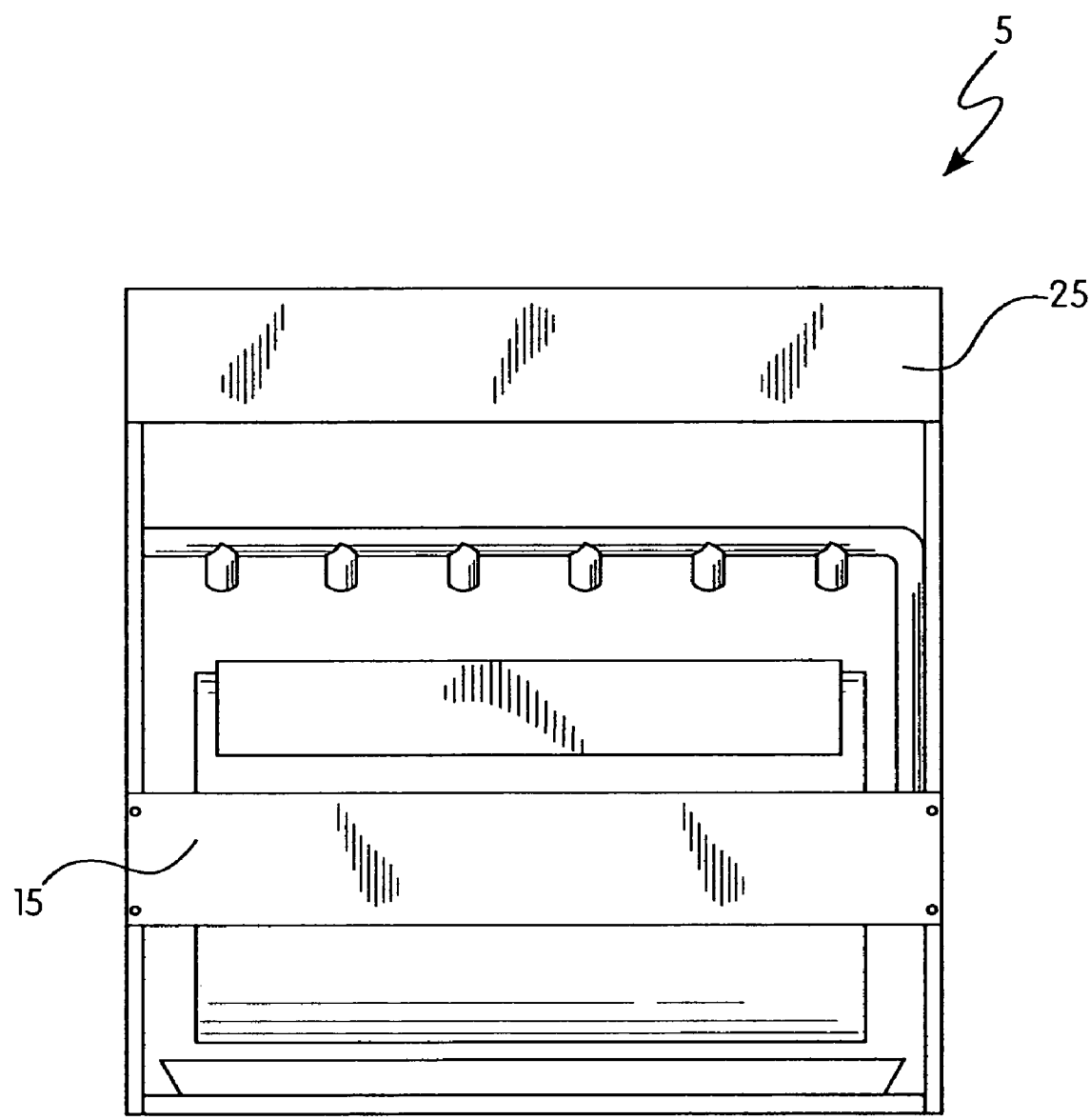
Figure 8:
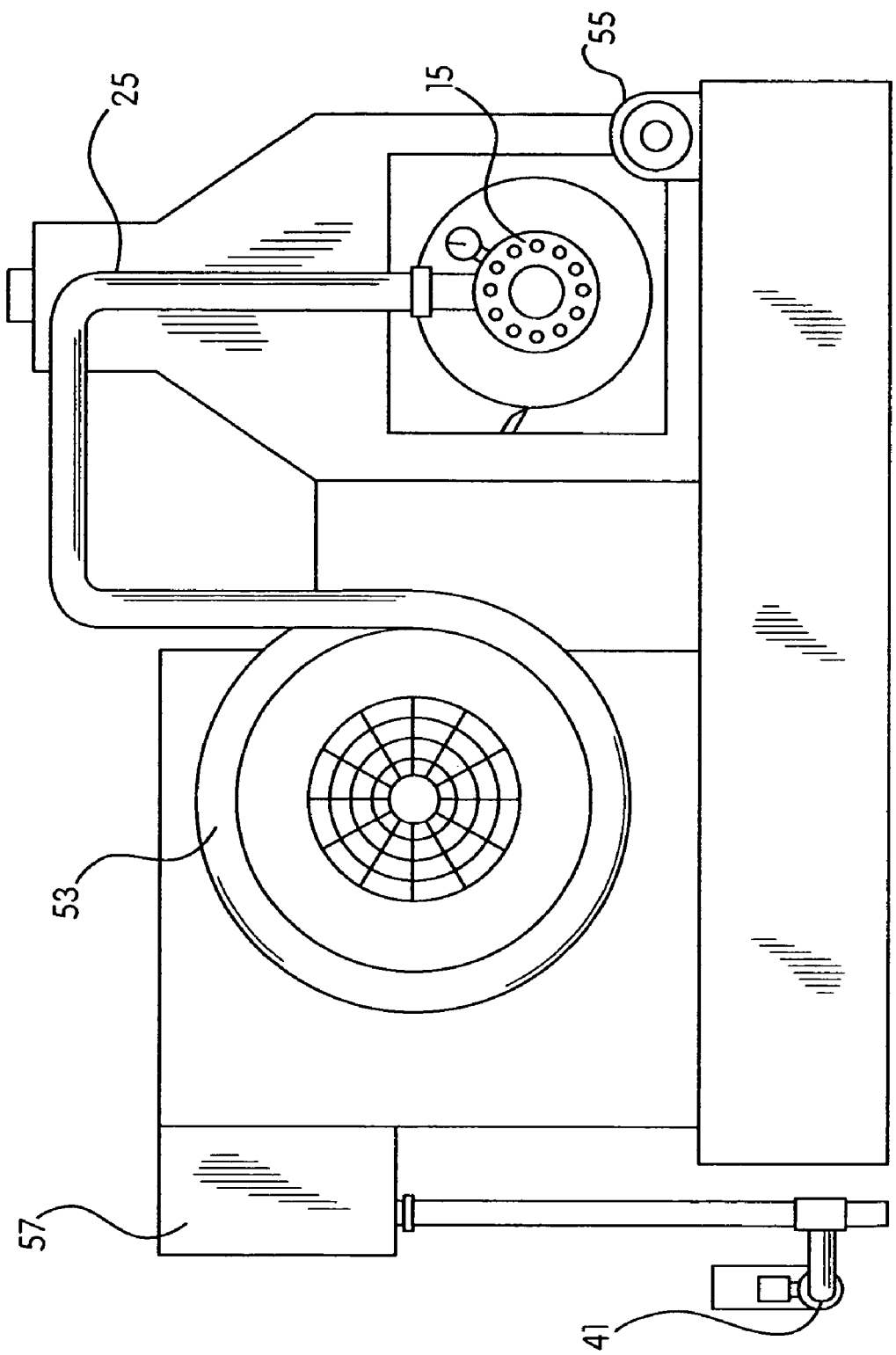
FIG. 8 is a combustion side view of one embodiment of the novel evaporator unit and system of the present invention.
Figure 9:
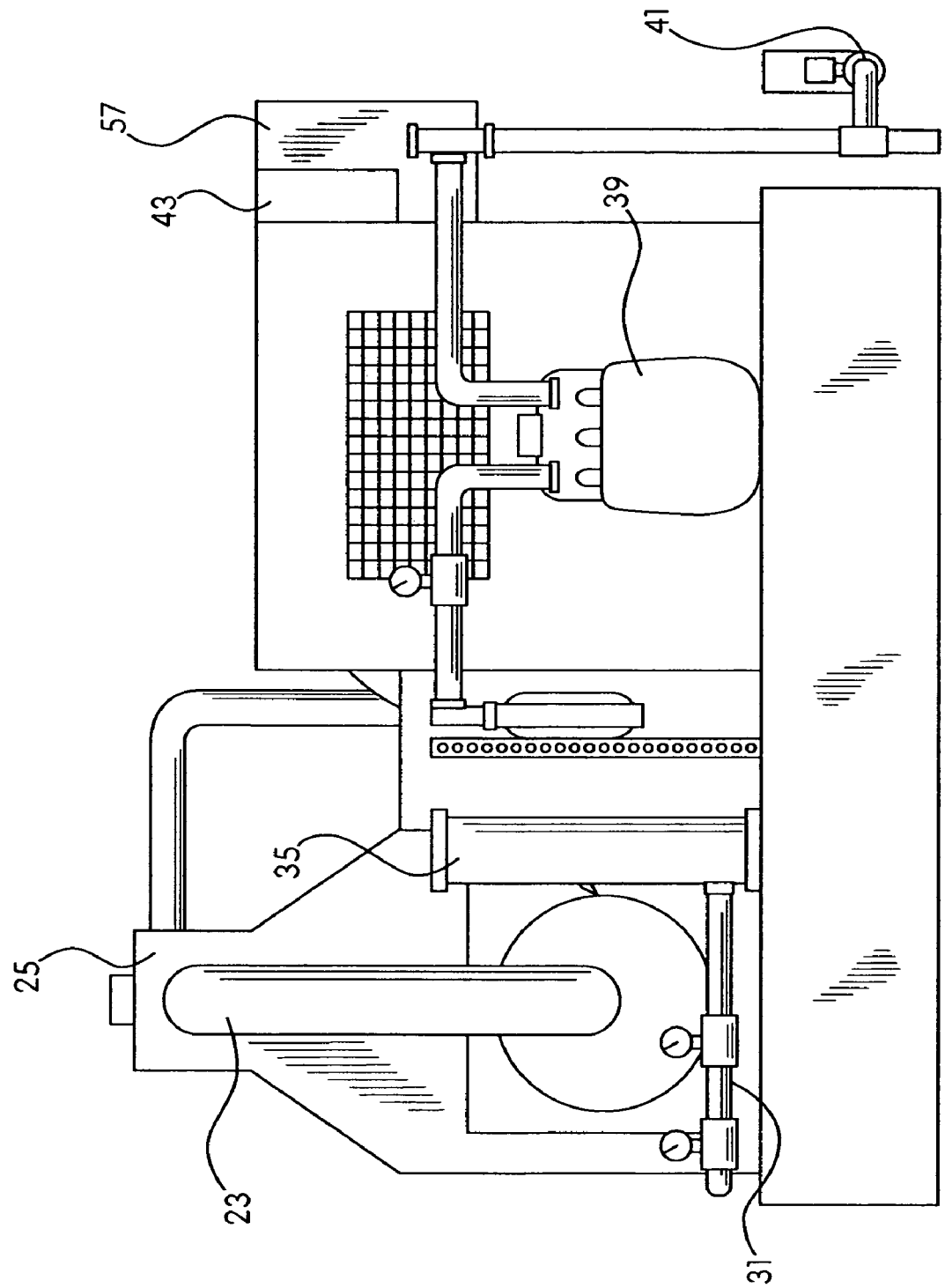
FIG. 9 is a gas inlet side view of one embodiment of the novel evaporator unit and system of the present invention.
Figure 10:
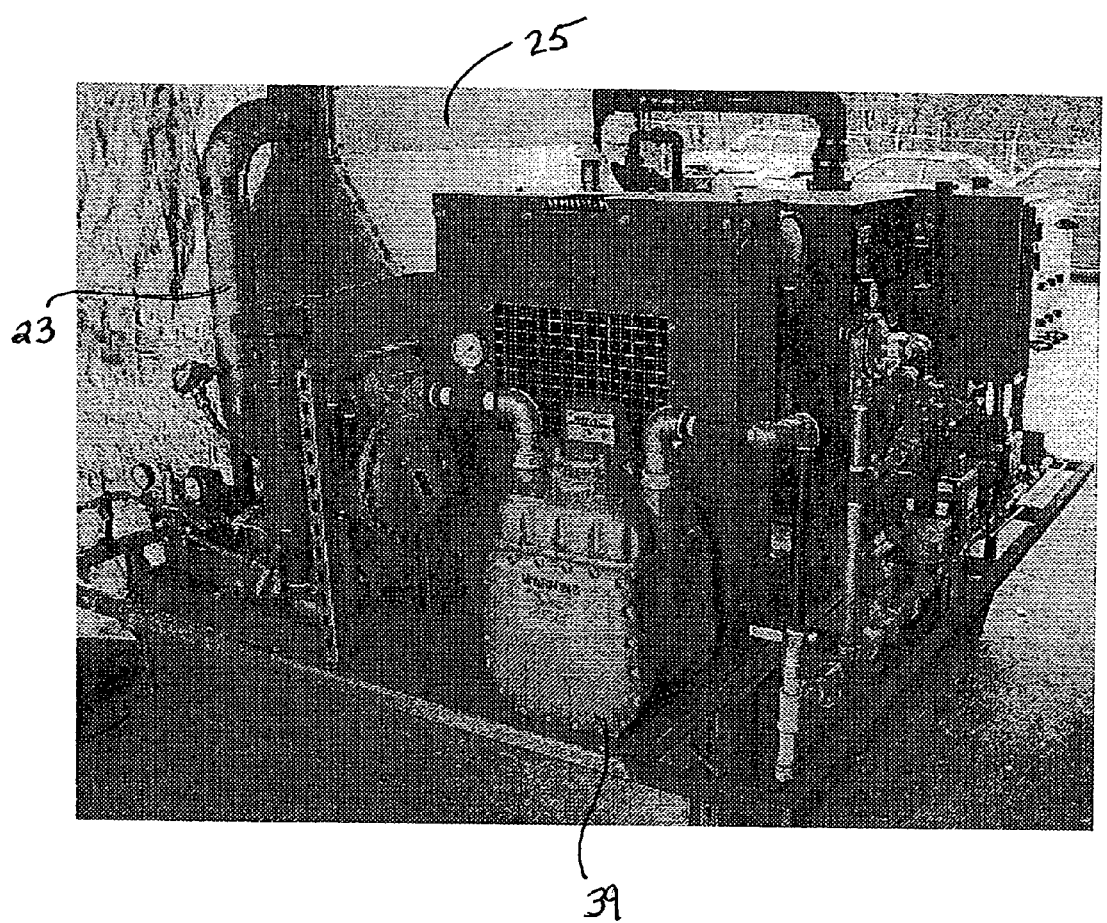
FIG. 10 is a slightly different perspective of FIG. 9, showing more of the right-hand side of the image in FIG. 9.
Figure 11:
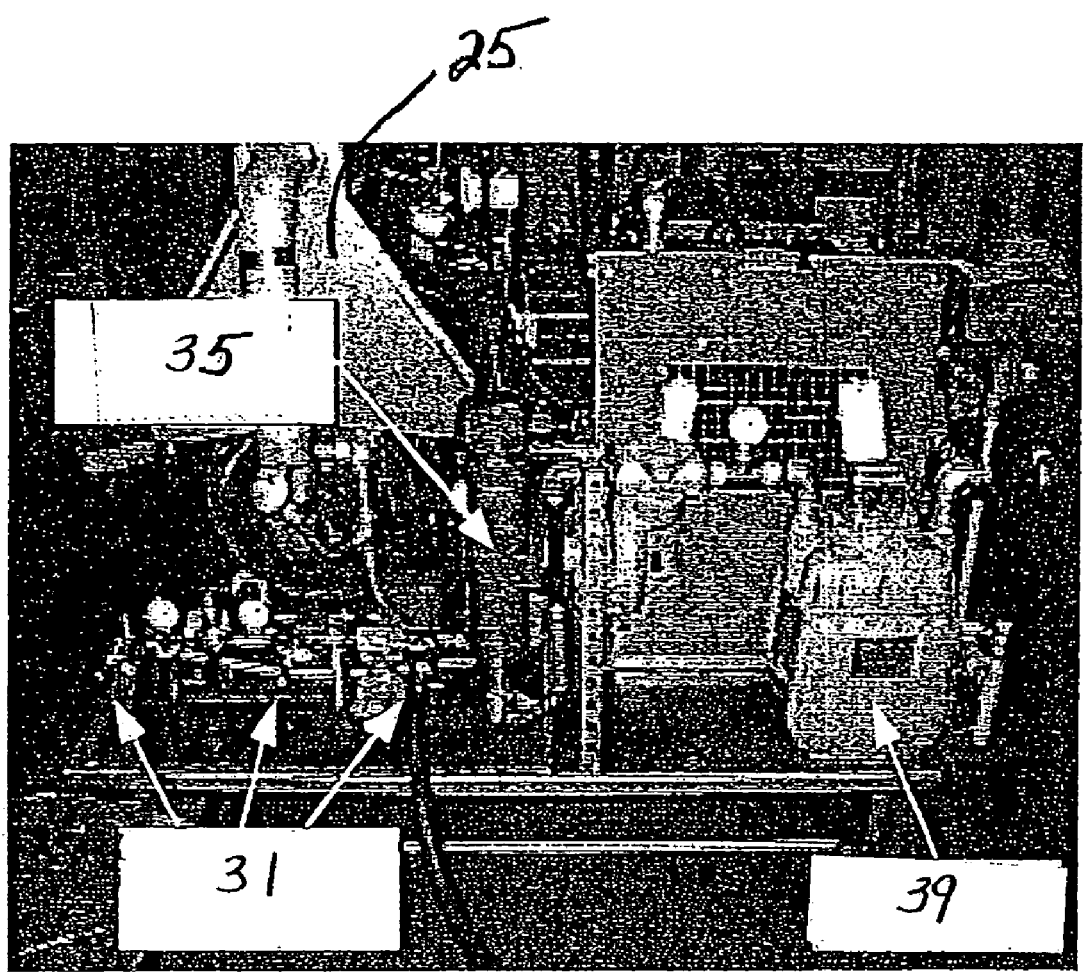
FIG. 11 illustrates a side view of one embodiment of the novel evaporator unit of the present invention, specifically showing the natural gas flow meter, the natural gas taps, the filter, and the contaminant hood.
Figure 12:
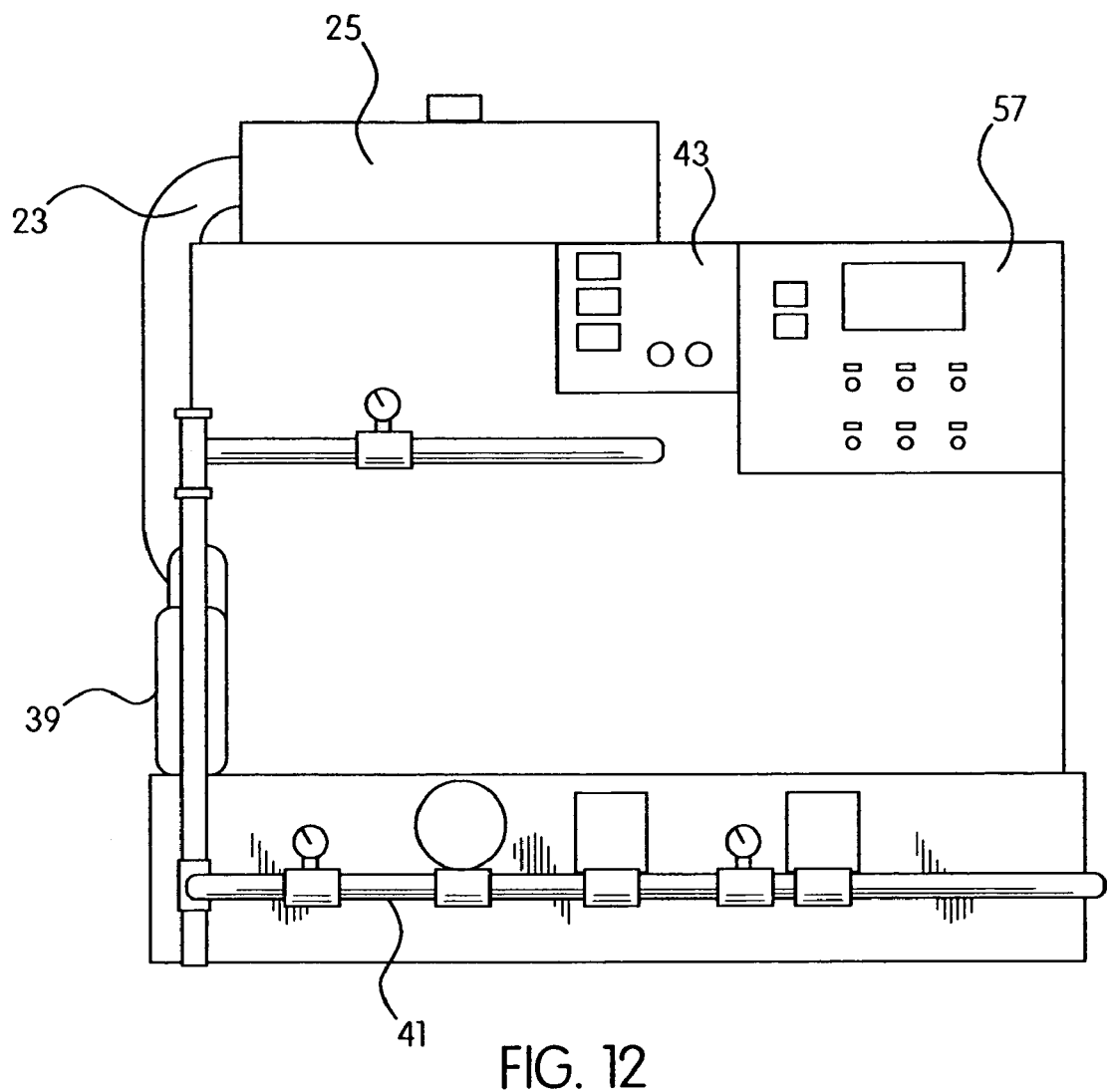
FIG. 12 is another side view of one embodiment of the novel evaporator unit according to the present invention, specifically illustrating the natural gas train, the electric generator, and the natural gas burner control panel.
Figure 13:
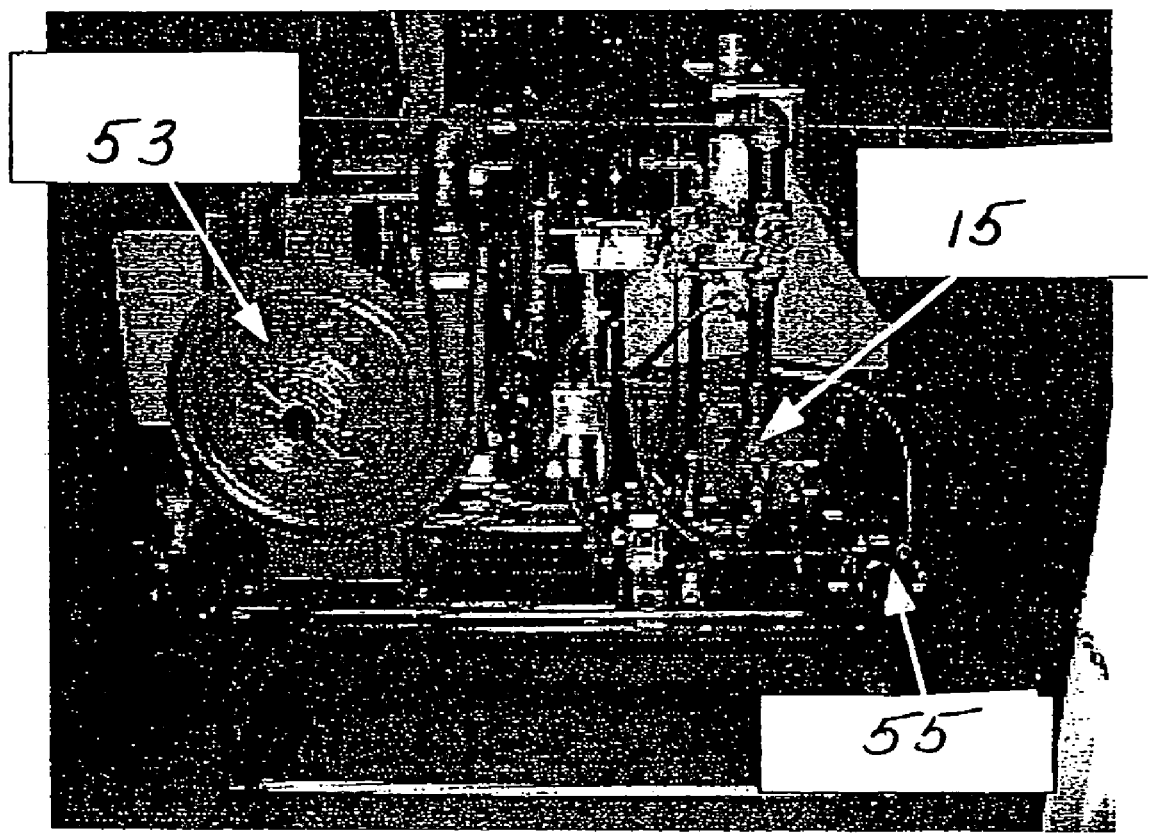
FIG. 13 is a side view of one embodiment of the novel evaporator unit according to the present invention specifically illustrating the combustion air blower, the gas burner, and the brine pump.
Figure 14:
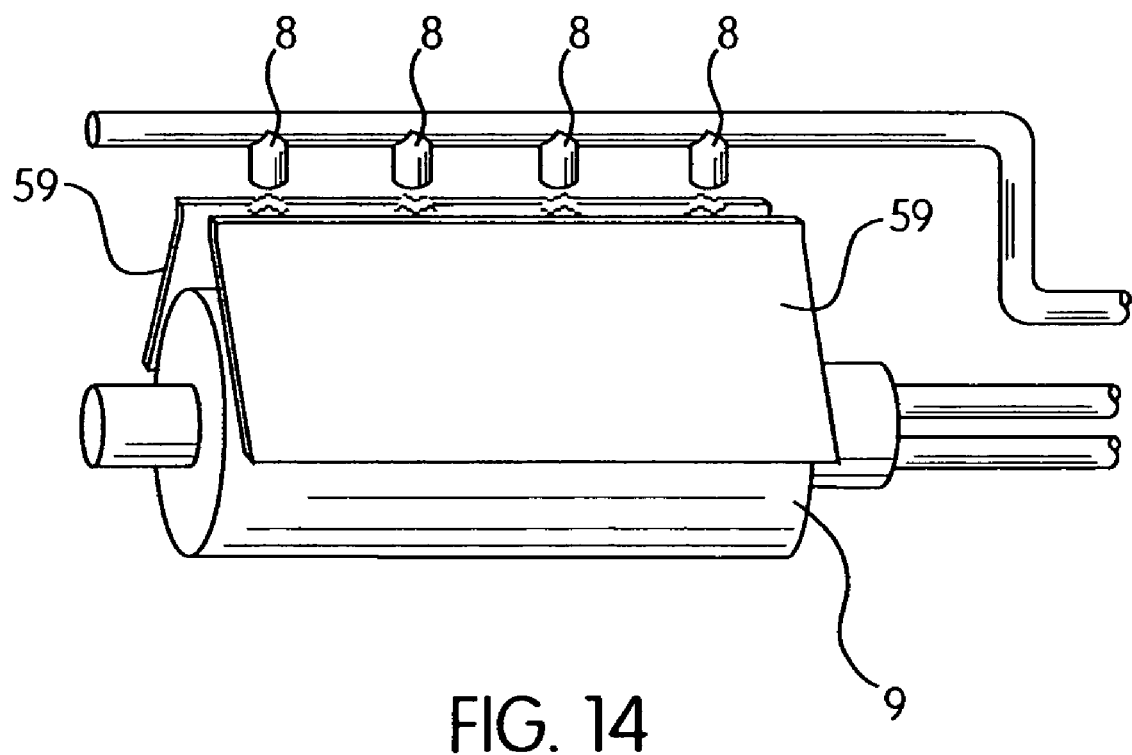
FIG. 14 illustrates one embodiment of the novel evaporator unit according to the present invention specifically indicating the location of the evaporator drum, the application nozzles, and the shield.
Figure 15:
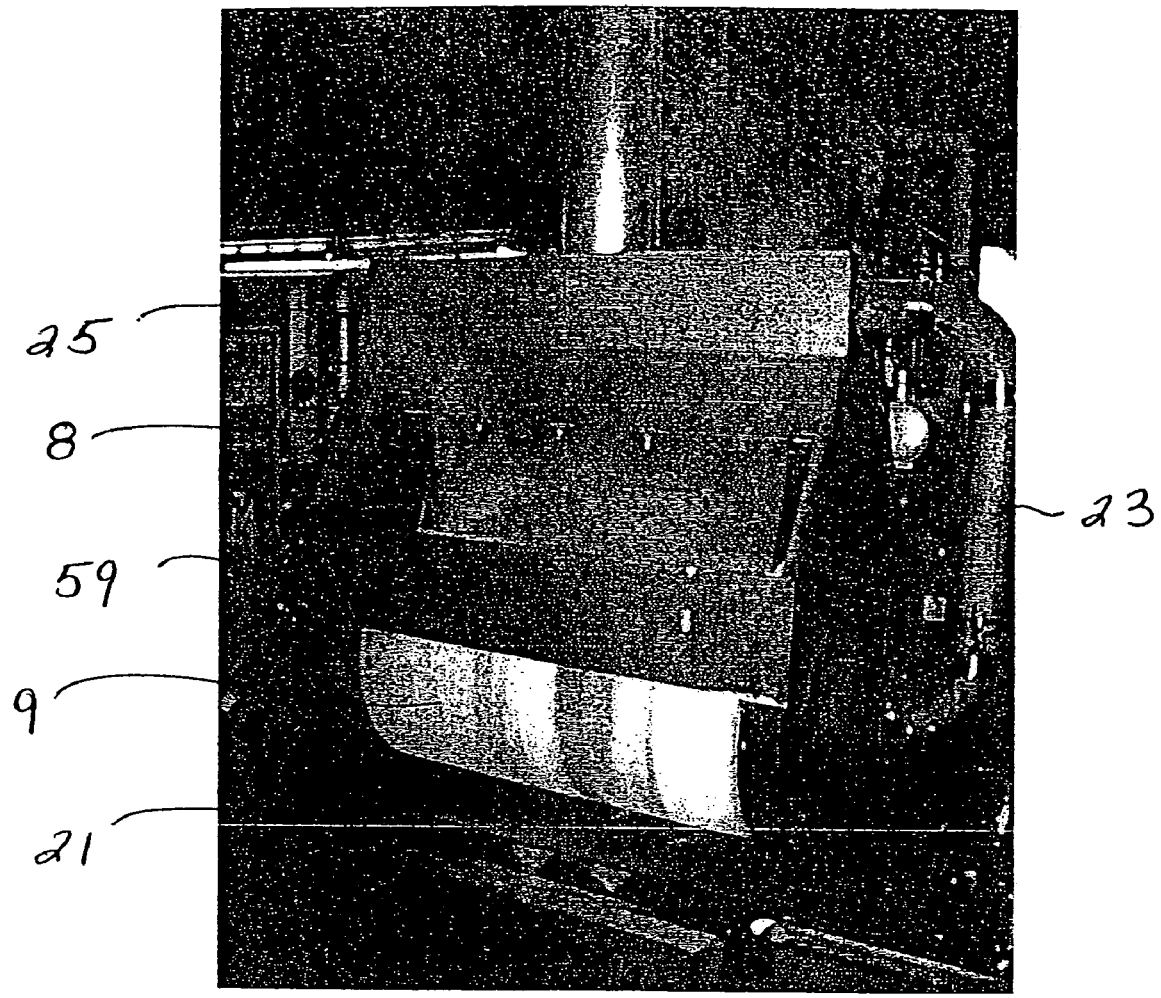
FIG. 15 illustrates one embodiment of the novel evaporator unit of the present invention evaporating brine.

FIG. 1 shows a natural gas well with a gas liquid separator and a brine tank. The novel, portable evaporator unit (5) of the present invention, in combination with a suitable pretreatment equipment, can be located at a site of the natural gas well, such as that shown in FIG. 1. Alternatively, the evaporator unit (5) of the present invention can be used as a stationary unit if connected to similar pretreatment and/or brine storage tanks. FIGS. 2 and 3 show overviews of portions of the novel evaporator unit and system (5) of the present invention specifically showing the contaminant hood (25), the evaporator drum (9), and the burner (15). FIGS. 8 though 16 show a variety of views and diagrams of the novel evaporator unit, process, and system of the present invention, which can be referred to for the purpose of illustration.

Figure 4A:
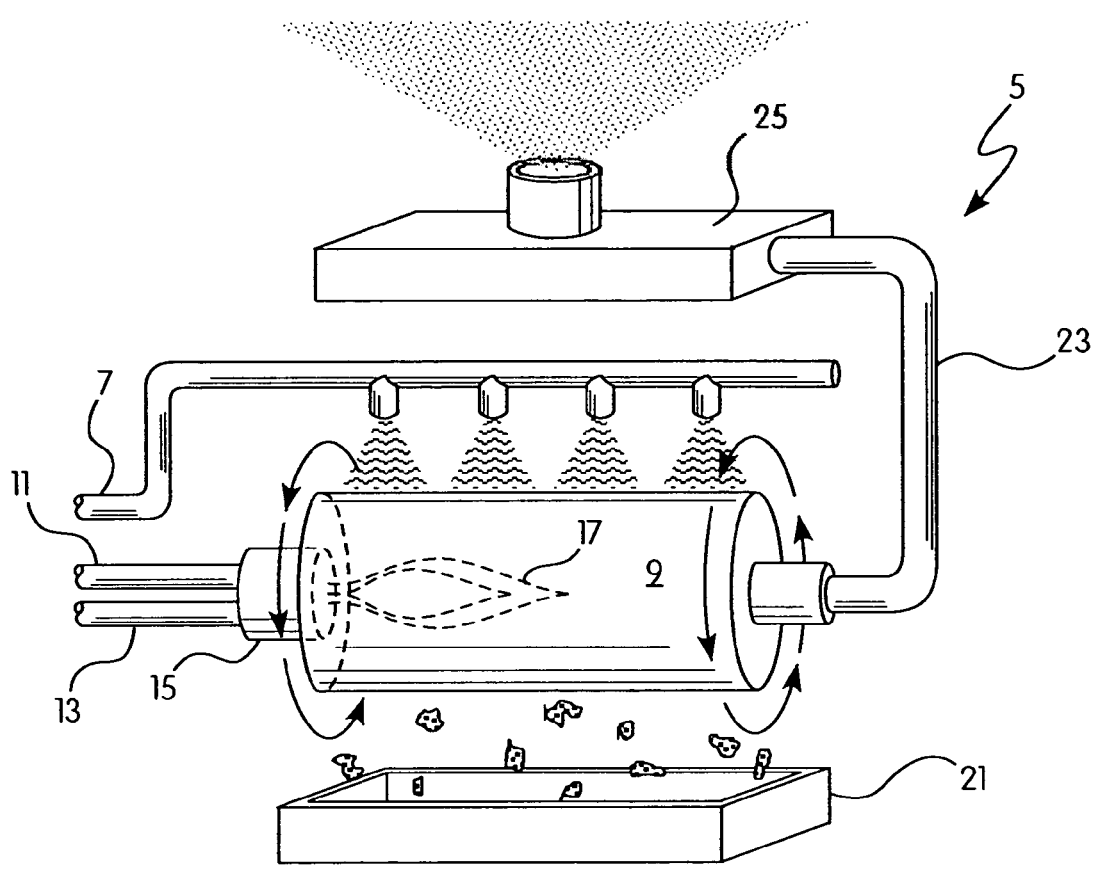
FIG. 4 is a schematic diagram illustrating the evaporation process and unit of one embodiment of the novel evaporator unit of the present invention.
Figure 4B:
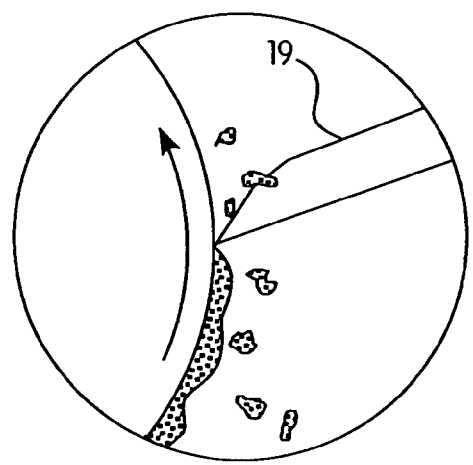

FIG. 4 is a detailed schematic diagram showing one embodiment of a portion of the evaporator unit, process, and system (5) of the present invention. Brine water is carried into the evaporator unit, process, and system (5) of the present invention from a storage or pretreatment tank via a brine water conduit (7) as shown in FIG. 4. The brine water is sprayed through atomization nozzles (8) and onto the evaporator drum (9). Air and natural gas (via an air conduit (11) and a natural gas conduit (13), respectively) are pumped into the burner (15), which is adjacent to the evaporator drum (9). The air and natural gas combine in the burner (15) and are ignited to produce a flame (17). The evaporator drum (9) rotates throughout the evaporation process at a speed that is sufficiently slow to allow the brine water to evaporate, but fast enough to make for an efficient evaporator unit (5).

Because the brine is sprayed on the surface of a hot, rotating evaporator drum (9), the water evaporates upon contact with the hot drum (9) surface leaving a solid salt on the surface of the evaporator drum (9). The water vapor from the evaporated brine water is released into the contaminant hood (25), which than releases the water vapor into the atmosphere. A scraping knife (19) (shown in the inset of FIG. 4) removes the solid salt from the evaporator drum (9) surface. The salt then falls into a storage bin (21) located beneath the evaporator drum (9), which is also shown in FIG. 4.

Figure 5:
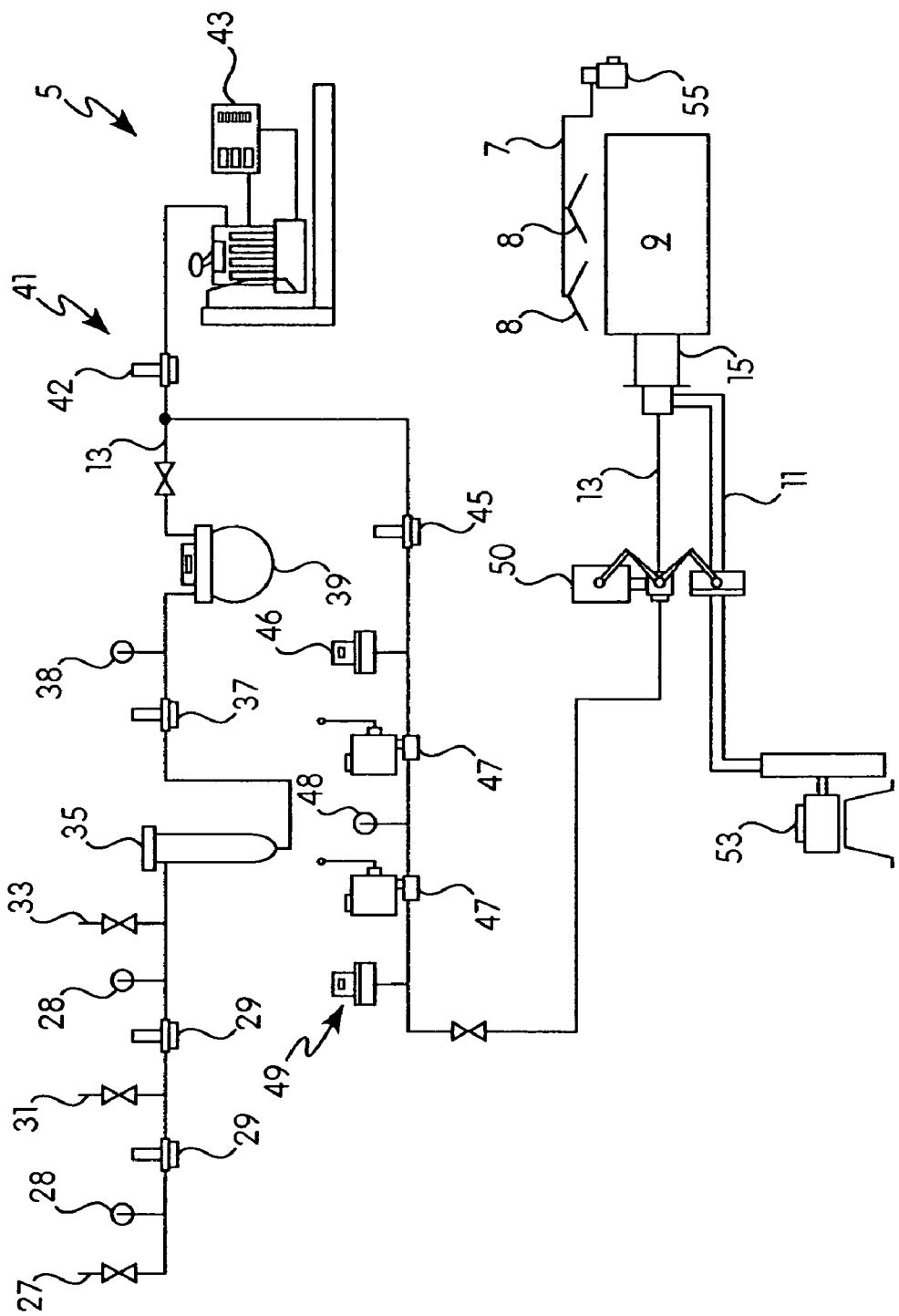
FIG. 5 is a schematic flow chart illustrating the apparatus, process, and system of one embodiment of the novel evaporation unit of the present invention.

A generalized schematic diagram of one embodiment of the evaporator system of the present invention is shown in FIG. 5. The natural gas conduit (13) connects most of the system. The natural gas conduit (13) carries natural gas, which was gathered at a wellhead (27). Pressure regulators (29), which sit on either side of the natural gas tap (31), regulate the pressure in the natural gas conduit (13).

The evaporator unit, process, and system (5) may contain an in-line gas filter (35), which removes any particulate matter and water from the natural gas. A natural gas flow meter (39) sits just outside a burner gas train (41). The burner gas train (41) consists of all the components used to control the natural gas and is located in this embodiment of the present invention after the natural gas flow meter (39) and up to the natural gas burner (15). The burner gas train (41) does not include a burner air blower (53), but does include a modulation motor (51).

In one embodiment of the present invention, shown in FIG. 5, a series of pressure regulators reduce the supply pressure down to about five to fifteen inches of water column prior to supplying the electric generator and gas burner. The maximum natural gas pressure that the unit can handle is approximately 1,480 psig.

An optional flow meter (39) can be placed in-line to measure the rate of natural gas consumption during the evaporation of the brine. The information obtained from the flow meter (39) provides a means to evaluate the unit's (5) efficiency (i.e., cubic feet of natural gas consumed per gallon of brine water evaporated).

Figure 6:
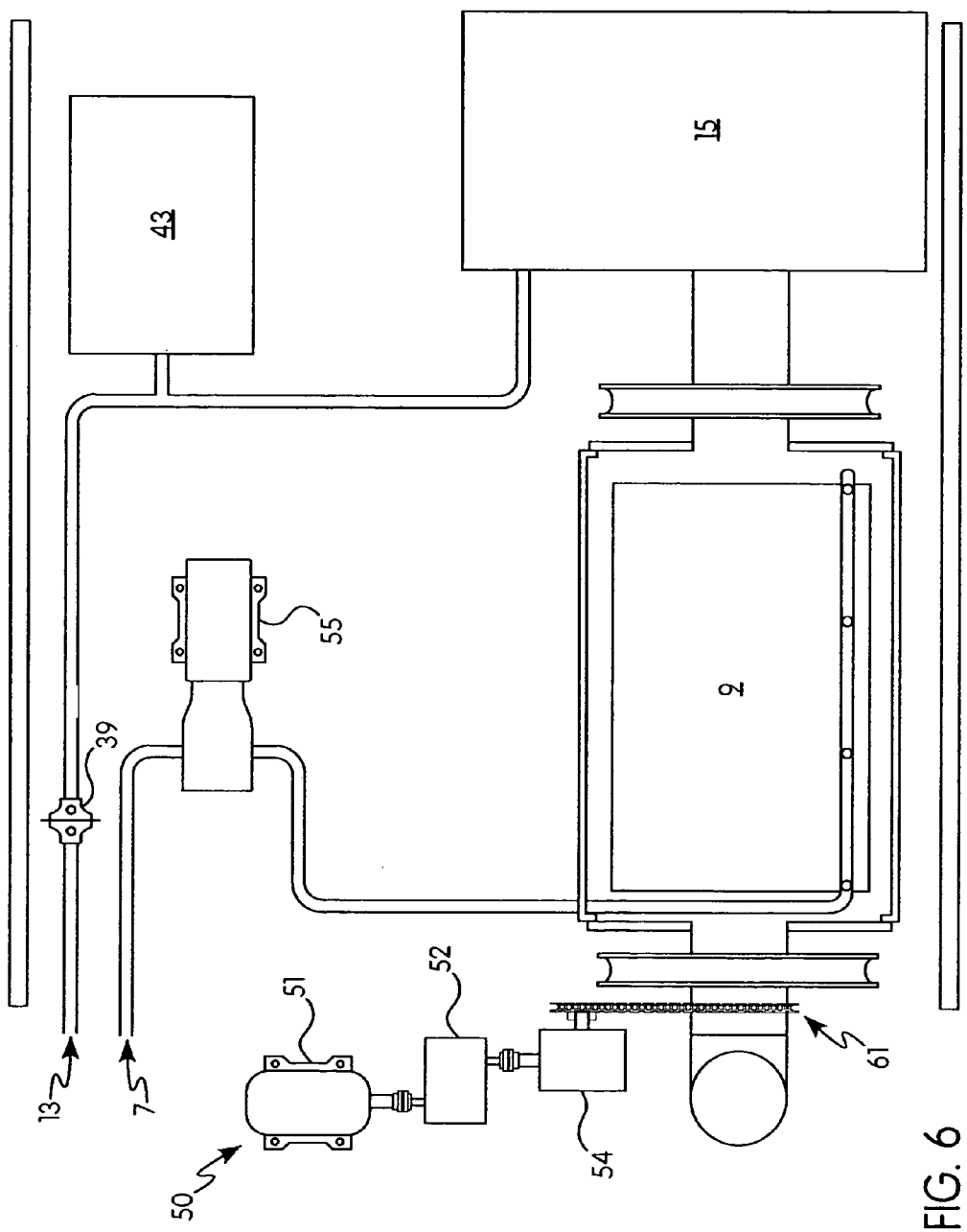
FIG. 6 illustrates one embodiment of the drive system of the novel evaporator unit, process, and system of the present invention.
Figure 7:
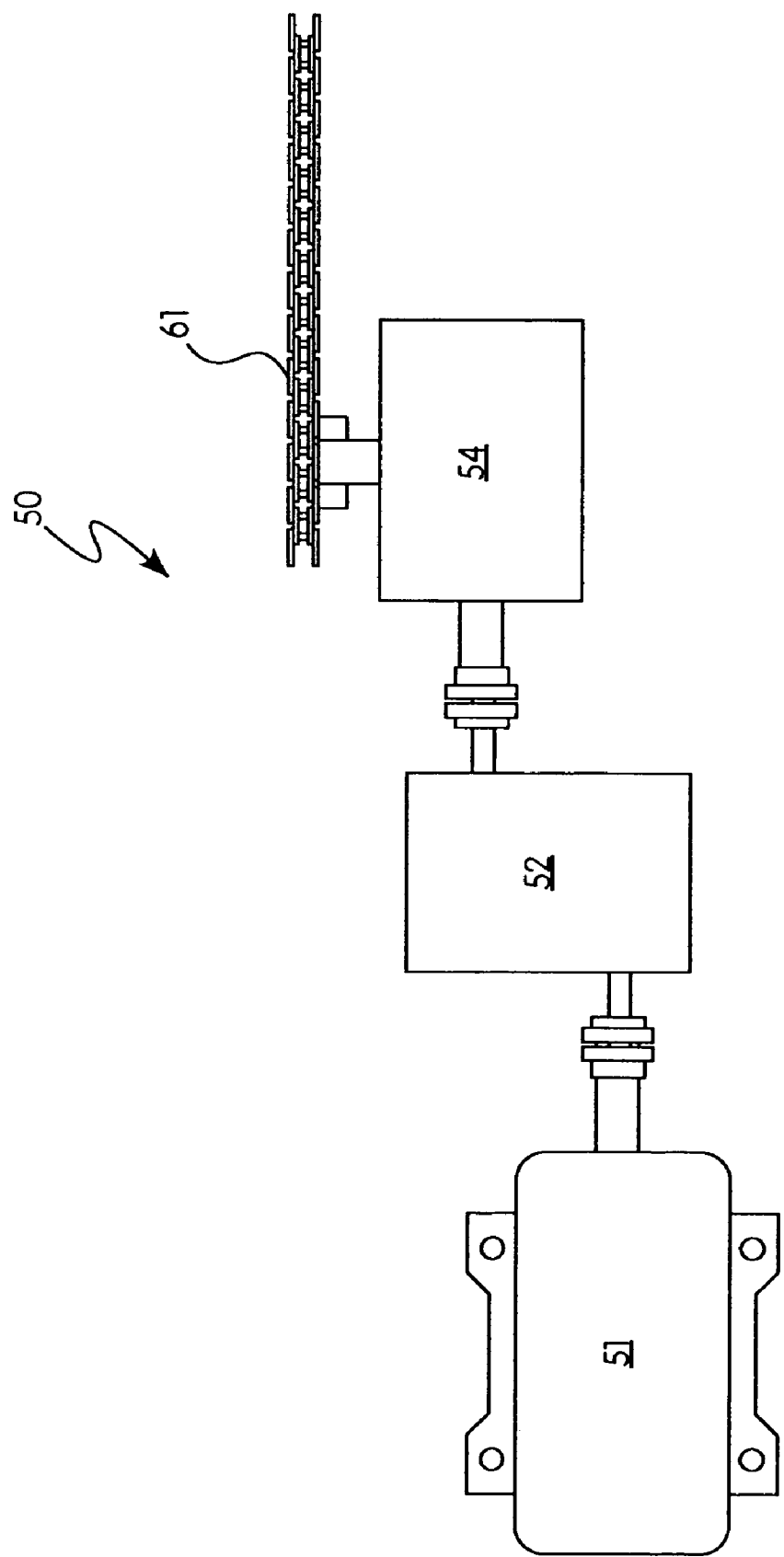
FIG. 7 is a diagram of one embodiment of the modulation motor assembly of the present invention.

The placement of an electric generator (43) is shown in FIG. 5. Shut off valves (47) sit between the electric motor (43) and the modulation motor assembly (50). The modulation motor assembly (50) (shown in FIGS. 6 and 7) comprises a modulation motor (51) connected to a clutch drive (52) connected to a worm gear (54). The worm gear (54) is connected by way of a chain (61) to the evaporation drum (9).

The modulation motor assembly (50) controls the amount of natural gas and air flowing from the natural gas conduit (13) and the air conduit (11) to the burner (15). Connected to the air conduit (11) is the burner air blower (53) which forces air into the air conduit (11). The burner (15) is connected to the evaporator drum (9) as explained previously with respect to FIG. 4. The brine pump (55) pumps the brine from a storage or treatment tank and into the brine water conduit (7) and to the atomization nozzles (8).

After the flow meter (39), the natural gas is supplied separately to the electric generator (43) and the burner gas train (41). In the preferred embodiment, a generator (43) may be installed to provide the approximately 220 V AC service (maximum 30 amp supply) necessary to operate the brine pump (55), the brine blower (53), the drum rotation motor, and burner controls. In one embodiment of the present invention, the maximum rate of natural gas consumed by the generator (43) set at full load is approximately 95 cubic feet per hour. During normal operations of brine evaporation system according to the preferred embodiment of the present invention, well below full load demand is placed on the generator set.

In the preferred embodiment, a mechanism similar to a 2-inch series "G" KINEMAX® burner, gas train, and control package (Maxon Corporation) may be used to provide the heat necessary for evaporating the brine. The maximum firing rate for the burner (15) in the preferred embodiment of this invention is approximately 1.0 million Btu per hour. Any chosen burner (15) should be able to operate at very high exit air levels, thereby allowing greater flexibility in the output gas temperature introduced into the rotary drum dryer.

The 2-inch series "G" KINEMAX® burner and gas train comply with the National Fire Protection Association Code. Such compliance is desirable in the preferred embodiment of the present invention. Additionally, in the preferred embodiment of the present invention the pilot will automatically light when the generator (43) is running and the control panel is turned on, but the operator must manually open the gas supply for the main flame when the system is first started. Such a step in the starter procedure allows the operator to verify that all safety conditions have been met before starting the evaporator unit (5).

Additional safeguards in the preferred embodiment include: (i) a combustion air blower (53) that must be operating before the main gas valves can be energized; and (ii) main gas valves that must be energized and a drum (9) that must be rotating before the brine can be delivered to the evaporator unit (5). Additional optional safeguards include: (i) pressure and temperature limits and relays; (ii) low gas pressure relays that require the operator to ensure that sufficient gas pressure and gas volume as supplied to the burner (15) to generate sufficient BTU to evaporate the brine at a rate sufficiently high so as to make the operation of the evaporator unit (5) economical. Also, high gas pressure relays may be used to shut down the system if the gas pressure is too high in the burner gas train (41) and before the burner (15). Optional low temperature relays increase the evaporator unit's (5) safety. The low temperature relay regulates gas flow to maintain a stable temperature for evaporation. The high temperature relay provides safety by shutting the system down if the temperature gets too high.

The combustion air blower (53), gas burner (15), and brine pump (55) are shown in FIG. 5. Natural gas and combustion air are both introduced to the burner (15) through a metering valve to control the ratio of gas to air. The valve also regulates the amount of natural gas burned to supply the heat required by the evaporator unit (5). The burner (15) is connected by a mechanical linkage to a gas flow modulator motor (51).

In the preferred embodiment of the present invention, a temperature controller allows the system to maintain constant flue gas temperature at the exit of the evaporator drum (9). Preferably, the temperature controller will have an electronic/digital readout and be fed by a probe. The temperature controller should not have to transmit a signal more than ten feet, or it can feed a signal to a relay that will generate a nearly constant signal so the gas supply can be changed to maintain a constant temperature. A type K thermocouple monitors the temperature while a second type K thermocouple along with a Barber Colman Model 7SL high/low Limitrol provide over temperature protection for the evaporator unit (5).

In the preferred embodiment of the present invention, a diaphragm pump was selected to deliver the brine from the pretreatment tank to the evaporator unit (5). The pump should have excellent resistance to corrosive attack by brine solutions. Ideally, the pump should also be able to self-prime when positioned up to nine feet above the liquid supply level. This may be important when the evaporator unit (5) skid must be located some distance on an upgrade from the pretreatment tank. The pump is capable of providing in excess of two gallons per minute of brine at 45 psig, more than sufficient pressure and flow rate for the itemization nozzles initially selected. In a preferred embodiment of the present invention, the pump (55) should supply two gallons/minute at 25 psi (+/−5 psi) with the ability to control the flow rate within the range of one to three gpm without an increase or decrease in pressure by use of a pressure regulator or bypass system.

The corrosive and abrasive nature of the brine requires that consideration be given to the materials of construction. Common materials used in contact with salt solutions include titanium, 317L stainless steel, CD-4 MCu, Incoloy 825, and Alloy 20. CD-4 MCu is a cast corrosion and heat resistant stainless steel alloy with good abrasion resistance. Incoloy is a high-grade nickel chromium alloy.

In the preferred embodiment of the present invention, all of the lines and conduits used to transport the brine are made of either chemically resistant tubing or 316 stainless steel. The contaminant hood (25) above the evaporation drum (9) may also be fabricated from stainless steel.

Preferably, the evaporator drum (9) is two feet in diameter by three feet in length. A row of atomization nozzles (8) (preferably, two to four nozzles) is used to apply the pretreated brine onto the top surface of the drum (9) as it revolves at one to three revolutions per minute. The number of nozzles utilized and the revolution rate of the drum (9) will vary with the size of the drum (9). Such variations are anticipated by and within the scope of this invention. The evaporator drum (9) and atomization nozzles (8) are shown in FIGS. 4 and 5.

Also shown in FIG. 4 is the scraping knife (19) used to remove the dried salt product. In the preferred embodiment, the scraping knife (19) is positioned to allow ¾ rotation of the drum (9) before removal of the dried salt product. Such positioning and timing results in a drying time of 0.25 to 0.27 minutes when the salt is in contact with the hot metal. With high heat transfer coefficients from 220 to 350 $Btu/ft^2$-h-° F. under optimum conditions, that should allow sufficient time for the brine to be dried to less than 1% moisture without damage to the salt product material.

Once removed from the drum (9), the dried salt falls into a salt storage bin (21) located beneath the evaporator unit (9). For the preferred embodiment of the present invention, the bin (21) should be constructed of stainless steel with sufficient volume to hold approximately 2,400 lbs. of salt. The bin (21) should also be designed for easy clean out, for example, by using fold down end gates. To ensure that the entire bin (21) volume is utilized, a spreader paddle may be installed just beneath the evaporator and may be geared to the same motor used for rotating the drum (9).

The generator set should be sized such that under normal operating conditions well below full load demand is placed on it. When the mechanical linkage for the natural gas burner (15) is properly adjusted, the burner (15) should light easily and the firing rate should be controlled to deliver a constant drum (9) exit temperature.

Figure 16:
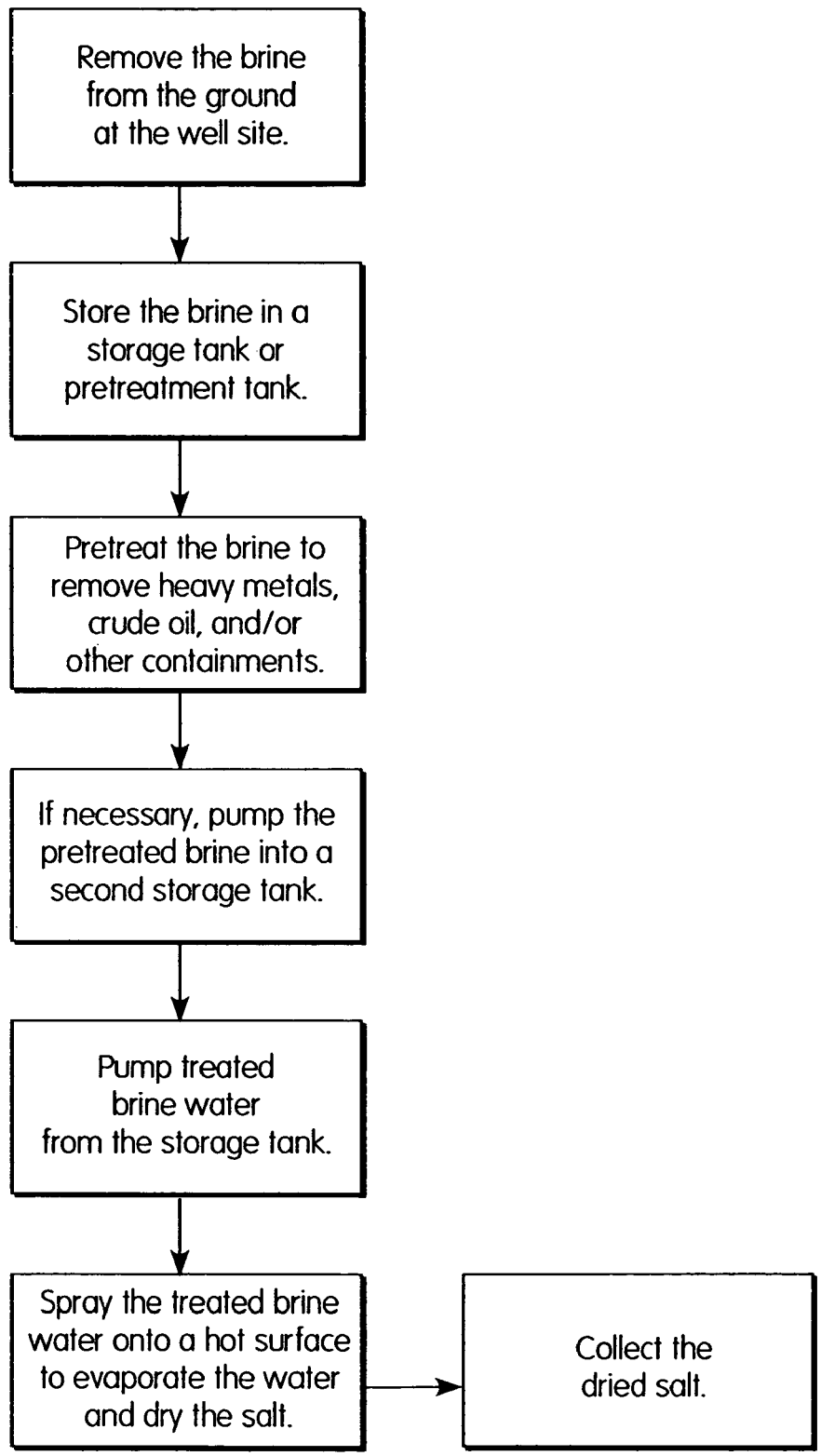
FIG. 16 illustrates one embodiment of the novel process and system of the present invention.

In the preferred embodiment of the present invention, the evaporator unit (5) is designed to be transported to the wellhead (27) where a brine tank, typically having an average capacity of 3,000 gallons, is located (see FIG. 1). Brine is removed from the brine tank, pretreated to remove the metals, and then pumped to the evaporator unit (5) (see FIG. 16). Finally, the dry salt recovered.

In the preferred embodiment, the desired processing flow rate of the brine is one gallon/minute. Therefore, the evaporator unit (5) would process a 3,000-gallon tank in approximately two days. A technician starts the evaporator unit (5) and then leaves the unit (5) unmanned until it has successfully evaporated all the brine, at which time the technician returns to the site to recover the resulting dry salt.

In the preferred embodiment of the present invention, the evaporation system is self-contained, requiring only a supply of natural gas to complete the evaporation of brine. The supply of natural gas can be tapped from either the wellhead (27) or the main line. Depending on the source, the supply pressure may vary. Natural gas supplied from the wellhead (27) can exceed 1,400 pounds per square inch (psig), while gas supplied from the main line will be approximately 400 to 500 psig.

In the preferred embodiment of the present invention, an approximate metal surface temperature of 550-650° F. will be achieved without the application of brine and at outlet temperature of 850° F. The surface temperature drops to approximately 450-550° F. when either tap water or brine is applied at 0.1 gallons per minute per nozzle.

The rate of natural gas consumption during evaporation of either the tap water or the brine in the preferred embodiment of the present invention is 30 MCF per 3,000 gallons, or 1 MCF per 100 gallons (1 MCF equals 1,000 CFM).

Also, in the preferred embodiment of the present invention, the recommended skid size limits the drum's (9) active surface area to 14.1 square feet. It will be obvious to those in the art that a variety of different nozzles (8) could be used with the present invention. The selection will be based upon the surface temperature, the drum (9) size, and the rotation speed. Preferably, the nozzles (8) will be able to apply one gallon per minute to the drum surface without the brine splashing off the drum. The nozzles (8) should not generate a brine mist or spray that is so fine (brine droplet particle size) that the brine rises with the water vapor and is exhausted.

Consistent removal of the dried salt from the drum (9) surface maintains good heat transfer to the fresh brine layer. The preferred embodiment and essential characteristics of the knife (19) are: (1) that it removes the dried salt from the drum (9) surface to maintain good heat transfer to the fresh brine layer, by not allowing more than ¹⁄₁₀₀" thickness of salt to remain on the drum (9) surface; (2) that the knife (19) must remove salt but not cut or remove metal from the drum (9) surface; and (3) that the knife (19) must be positioned to remove the salt so that it does not adhere to the knife (19) and directs the salt to fall by gravity.

Finally, a number of control/safety sensors may be added to improve the evaporator's performance. Such optional sensors include a flow switch on the brine supply line and a bin level sensor, both of which would shut down the evaporator when either all the brine has been processed for the salt bin (21) is full.

The invention claimed is:

1. A process for removing and concentrating brine in a waste stream produced from oil and gas well production, said process comprising the steps of: (a) transporting a treatment unit to an oil and gas well production site; (b) separating brine from oil and sludge in the waste stream and pumping the brine to said treatment unit; (c) removing dissolved metals in the brine; (d) heating and evaporating the brine in the treatment unit; and (e) retaining the solid brine resulting from the heating and evaporating step (d), wherein a solid salt product is produced, and wherein the treatment unit of step (a) comprises: (i) a pump for bringing brine to an evaporator unit; (ii) a rotating, evaporator drum; (iii) a drive motor assembly; (iv) a spray assembly for spraying brine onto said evaporator drum; (v) a heating assembly for heating said evaporator drum and brine sprayed thereon; and (vi) a scraping knife for removing solid deposits on said drum that remain after evaporation.

2. The process of claim 1 wherein heating step (d) uses natural gas from the oil and gas well production.

3. The process of claim 1 wherein the process further comprises: scraping solid deposits of brine from said evaporator drum.

* * * * *